(12) United States Patent
Wei et al.

(10) Patent No.: US 12,340,628 B2
(45) Date of Patent: Jun. 24, 2025

(54) HAND TRACKING METHOD, HOST, AND HAND TRACKING SYSTEM UTILIZING A HAND-HELD DEVICE

(71) Applicant: HTC Corporation, Taoyuan (TW)

(72) Inventors: Chang-Hua Wei, Taoyuan (TW); Yu-Ling Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/600,799

(22) Filed: Mar. 11, 2024

(65) Prior Publication Data

US 2024/0321010 A1    Sep. 26, 2024

Related U.S. Application Data

(60) Provisional application No. 63/453,449, filed on Mar. 20, 2023.

(51) Int. Cl.
*G06V 40/20* (2022.01)
*G06F 3/01* (2006.01)
*G06F 3/0346* (2013.01)
*G06T 7/70* (2017.01)
(Continued)

(52) U.S. Cl.
CPC .............. *G06V 40/28* (2022.01); *G06F 3/012* (2013.01); *G06F 3/017* (2013.01); *G06F 3/0346* (2013.01); *G06T 7/70* (2017.01); *G06V 10/764* (2022.01); *G06V 40/11* (2022.01); *G06T 2207/20221* (2013.01)

(58) Field of Classification Search
CPC ...... G06V 40/28; G06V 10/764; G06V 40/11; G06F 3/012; G06F 3/017; G06F 3/0346; G06F 3/011; G06T 7/70; G06T 2207/20221
See application file for complete search history.

(56) References Cited

U.S. PATENT DOCUMENTS 11,467,675 B1 * 10/2022 Hooker .................. G06F 3/017
2004/0263473 A1 * 12/2004 Cho ........................ G06F 3/014
345/156
(Continued)

FOREIGN PATENT DOCUMENTS

CN    105550655    5/2016
CN    111814645    10/2020
(Continued)

OTHER PUBLICATIONS

"Office Action of Taiwan Counterpart Application", issued on Mar. 5, 2025, p. 1-p. 6.

*Primary Examiner* — David D Davis
(74) *Attorney, Agent, or Firm* — JCIPRNET

(57) ABSTRACT

The embodiments of the disclosure provide a method for hand tracking. The method includes following steps. A first image of a hand is obtained through a head-mounted device. A first pose of a first part of the hand is determined through a processor based on the first image. A second image of the hand is obtained through a hand-held device. A second pose of a second part of the hand is determined through a processor based on the first image. The first part and the second part complementarily form an entirety of the hand. A gesture of the hand is determined through the processor based on the first pose and the second pose.

20 Claims, 5 Drawing Sheets

(51) Int. Cl.
*G06V 10/764* (2022.01)
*G06V 40/10* (2022.01)

(56) References Cited

U.S. PATENT DOCUMENTS

| | | | | |
|---|---|---|---|---|
| 2014/0098018 | A1* | 4/2014 | Kim | G06F 3/014 |
| | | | | 345/156 |
| 2015/0022438 | A1* | 1/2015 | Hong | G06F 3/017 |
| | | | | 345/156 |
| 2015/0084884 | A1* | 3/2015 | Cherradi El Fadili | |
| | | | | G06F 3/0233 |
| | | | | 345/173 |
| 2016/0054798 | A1* | 2/2016 | Messingher | G06F 3/014 |
| | | | | 345/156 |
| 2020/0005026 | A1* | 1/2020 | Andersen | A63F 13/428 |
| 2021/0263592 | A1* | 8/2021 | Chang | G06T 7/73 |
| 2021/0279893 | A1* | 9/2021 | Iwanowski | G06V 10/143 |
| 2023/0048398 | A1* | 2/2023 | Mounier | G06F 3/011 |

FOREIGN PATENT DOCUMENTS

| | | |
|---|---|---|
| TW | I471815 | 2/2015 |
| TW | I529608 | 4/2016 |
| TW | 202301079 | 1/2023 |

\* cited by examiner

HAND TRACKING METHOD, HOST, AND HAND TRACKING SYSTEM UTILIZING A HAND-HELD DEVICE

CROSS-REFERENCE TO RELATED APPLICATION

This application claims the priority benefit of U.S. provisional application Ser. No. 63/453,449, filed on Mar. 20, 2023. The entirety of the above-mentioned patent application is hereby incorporated by reference herein and made a part of this specification.

BACKGROUND

Technical Field

The disclosure relates to a hand tracking method; particularly, the disclosure relates to a hand tracking method, a host, and a hand tracking system.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a hand tracking method, a host, and a hand tracking system, so as to improve an accuracy of a hand tracking.

The embodiments of the disclosure provide a method for hand tracking. The method includes following steps. A first image of a hand is obtained through a head-mounted device. A first pose of a first part of the hand is determined through a processor based on the first image. A second image of the hand is obtained through a hand-held device. A second pose of a second part of the hand is determined through a processor based on the first image. The first part and the second part complementarily form an entirety of the hand. A gesture of the hand is determined through the processor based on the first pose and the second pose.

The embodiments of the disclosure provide a host. The host includes a storage circuit and a processor. The storage circuit stores a program code. The processor is coupled to the storage circuit and accessing the program code to execute following steps. A first image of a hand is obtained through a head-mounted device. A first pose of a first part of the hand is determined through a processor based on the first image. A second image of the hand is obtained through a hand-held device. A second pose of a second part of the hand is determined through a processor based on the first image. The first part and the second part complementarily form an entirety of the hand. A gesture of the hand is determined through the processor based on the first pose and the second pose.

The embodiments of the disclosure provide a host. The host includes a storage circuit and a processor. The storage circuit stores a program code. The processor is coupled to the storage circuit and accessing the program code to execute: obtaining, through a head-mounted device, a first image of a hand; determining a first pose of a first part of the hand based on the first image; obtaining, through a hand-held device, a second image of the hand; determining a second pose of a second part of the hand based on the second image, wherein the first part and the second part complementarily form an entirety of the hand; and determining a gesture of the hand based on the first pose and the second pose.

The embodiments of the disclosure provide a hand tracking system. The hand tracking system includes a head-mounted device, a hand-held device, a storage circuit, and a processor. The head-mounted device is adapted to be mounted on a head. The head-mounted device includes a first camera. The first camera is configured to obtain a first image of a hand. The hand-held device is adapted to be worn on the hand. The hand-held device includes a body part and an extension part. The body part is adapted to be hold by the hand. The extension part extends from the body part. The extension part includes a second camera. The second camera is configured to obtain a second image of the hand. The storage circuit stores a program code. The processor is coupled to the storage circuit and accessing the program code to execute: obtaining, through a head-mounted device, a first image of a hand; determining a first pose of a first part of the hand based on the first image; obtaining, through a hand-held device, a second image of the hand; determining a second pose of a second part of the hand based on the second image, wherein the first part and the second part complementarily form an entirety of the hand; and determining a gesture of the hand based on the first pose and the second pose.

Based on the above, according to the hand tracking method, the host, and the hand tracking system, an accuracy of a hand tracking is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
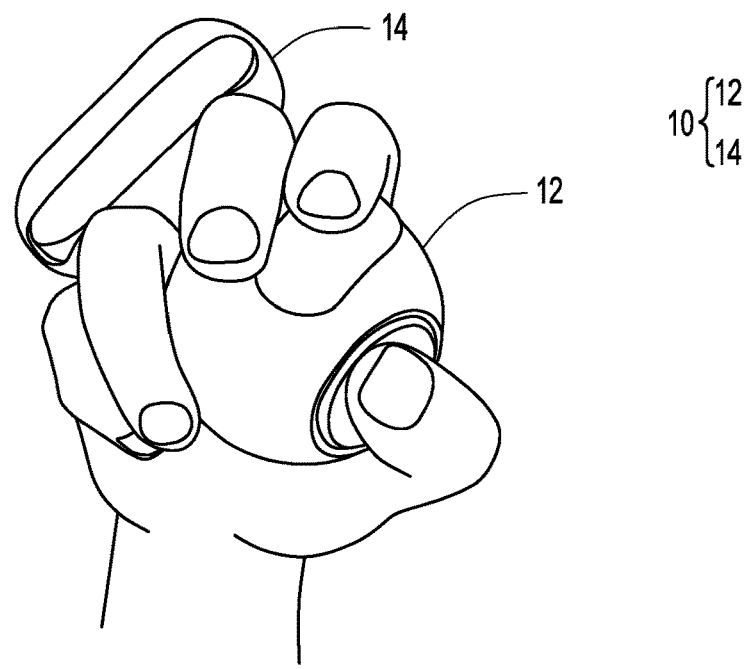
FIG. 1A is a schematic diagram of a hand-held device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

In order to bring an immersive experience to user, technologies related to XR, such as AR, VR, and MR are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

A hand-held controller is a device to provide a more immersive experience than other input methods, such as keyboard and mouse. This is because the hand-held controller allows a user to interact with the virtual world in a more natural way, as if the user were actually there. For example, the user can use the hand-held controller to pick up an object, throw an object, and interact with virtual buttons and switches. However, one limitation of the hand-held controller is that the hand-held controller requires the user to hold it. This may limit hand movement and make it difficult to perform certain tasks. For example, the user is unable to perform an open hand gesture while holding the hand-held controller.

In order to mitigate the impact of the hand-held controller on hand movement, a strapped controller may be utilized. By strapping the controller to the hand, the hand can move freely. However, the strapped controller also has some disadvantages. First, it can be more difficult to design the strapped controller. A strap needs to be comfortable and secure, and the strap needs to be able to accommodate a variety of hand sizes. Second, the strapped controller may be more difficult to use. The user needs to learn how to put on and take off the strap correctly, and the user needs to get used to the feeling of having something strapped to the hand.

Figure 1B:
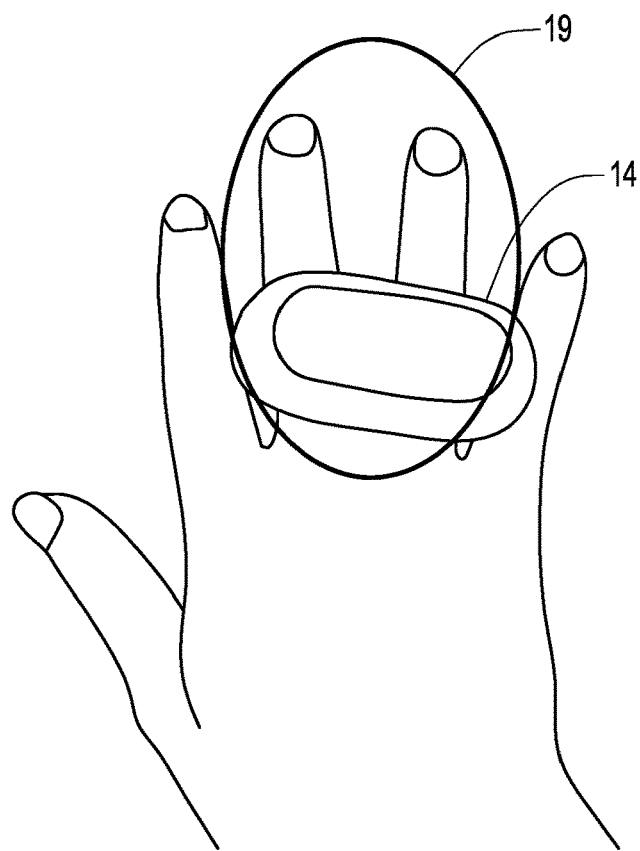
FIG. 1B is a schematic diagram of a hand-held device according to an embodiment of the disclosure.

FIG. 1A and FIG. 1B are schematic diagrams of a hand-held device according to an embodiment of the disclosure. With reference to FIG. 1A, a hand-held device 10 includes a body part 12 and an extension part 14. A shape of the body part may vary, but the shape is typically designed to be ergonomic and comfortable to hold by a hand of a user. The extension part 14 extends from the body part 12 and a gap is located between the extension part 14 and the body part 12, so that the user can insert the fingers through the gap to fix the hand-held controller 10 on the hand. In addition, the extension part 14 may be made of an elastic material, so that the gap may be adjustable to fit the size of the user's finger. Since the hand-held controller 10 is fixed on the hand, the user is still able to perform an open hand gesture while wearing the hand-held controller.

Hand tracking is a technology that allows a user to interact with an XR environment using the user's bare hand. For example, a hand tracking system may use a camera to track a position and an orientation of the user's hand in real time. It is noteworthy that, as shown in FIG. 1B, when the hand-held controller 10 is used in the XR environment to provide the user a more immersive and interactive experience, the hand-held controller 10 may also block the user's hand (e.g. occlusion 19 shown in FIG. 1B), which may affect the accuracy of the hand tracking. Therefore, there is a need to improve the accuracy of the hand tracking when wearing the hand-held controller 10.

Figure 2:
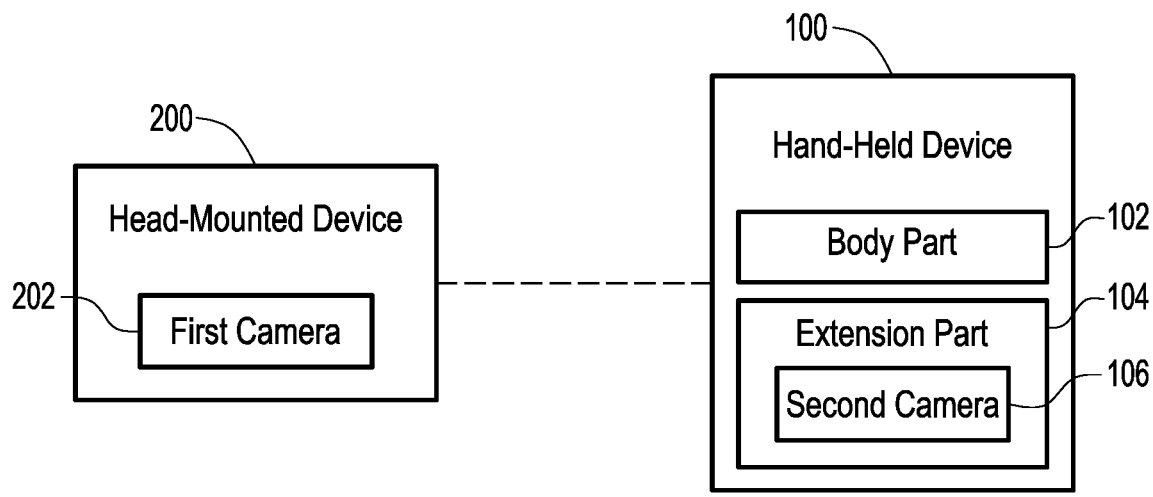
FIG. 2 is a schematic diagram of a hand tracking system according to an embodiment of the disclosure.

FIG. 2 is a schematic diagram of a hand tracking system according to an embodiment of the disclosure. With reference to FIG. 2, a hand tracking system may include a head-mounted device 200 and a hand-held device 100. The head-mounted device 200 may be adapted to be mounted on a head of a user and the hand-held device 100 may be adapted to be worn on a hand of the user. The head-mounted device 200 may include a first camera 202. The hand-held device 100 may include a body part 102 and an extension part 104. The extension 104 may include a second camera 106.

It is worth mentioned that, the body part 102 and the extension part 104 may be similar as the body part 12 and the extension part 14. That is, details of the body part 102 and the extension part 104 may be referred to the descriptions of the body part 12 and the extension part 14 to obtain sufficient teachings, suggestions, and implementation embodiments, while the details are not redundantly described seriatim herein. However, this disclosure is not limited thereto.

In one embodiment, the first camera 202 of the head-mounted device 200 may be configured to provide a first image for a hand tracking of a hand of a user. Further, when the user is wearing the hand-held device 100, the second camera 106 may be configured to provide a second image for the hand tracking of the hand of the user. In this manner, by a fusion of the first image from the first camera 202 and the second image from the second camera 106, an accuracy of the hand tracking may be improved when the user is wearing the hand-held device 100.

In one embodiment, by the fusion of the first image from the first camera 202 and the second image from the second camera 106, a simultaneous localization and mapping (SLAM) map of an environment around the user may be generated utilizing a SLAM algorithm. Based on the SLAM map, positions and orientations of the head-mounted device 200 and the hand-held device 100 may be respectively determined.

In one embodiment, the head-mounted device 200 and the hand-held device 100 may respectively include a tracker. For example, the head-mounted device 200 may include a first tracker and the hand-held device 100 may include a second tracker. The tracker may be, for example, a gyroscope, an accelerometer, an inertial measurement unit (IMU) sensor, other similar devices, or a combination of these devices. Based on the data from of the tracker, linear acceleration values and/or angular velocities of the head-mounted device 200 and the hand-held device 100 over time may be respectively obtained. However, this disclosure is not limited thereto. Moreover, based on the acceleration values and/or angular velocities of the head-mounted device 200 and the hand-held device 100, rotation information and displacement information of the head-mounted device 200 and the hand-held device 100 may be obtained. Based on the rotation information and displacement information, the first image captured by the first camera 202 of the head-mounted device 200 and the second image captured by the second camera 106 of the hand-held device 100 may be combined together in spatial coordinates to create a complete image of the hand. In this manner, based on the complete image of the hand, an accurate hand pose of the hand may be obtained.

In one embodiment, the head-mounted device 200 and the hand-held device 100 may respectively include a communication circuit. The communication circuit may be, for example, a wired network module, a wireless network module, a Bluetooth module, an infrared module, a radio frequency identification (RFID) module, a Zigbee network module, or a near field communication (NFC) network module, but the disclosure is not limited thereto. That is, the head-mounted device 200 may communicate with hand-held device 100 through either wired communication or wireless communication.

In some embodiments, the head-mounted device 200 may be, for example, an XR device, such as a pair of AR/VR glasses and/or a head-mounted display (HMD) device. However, this disclosure is not limited thereto.

Figure 3:
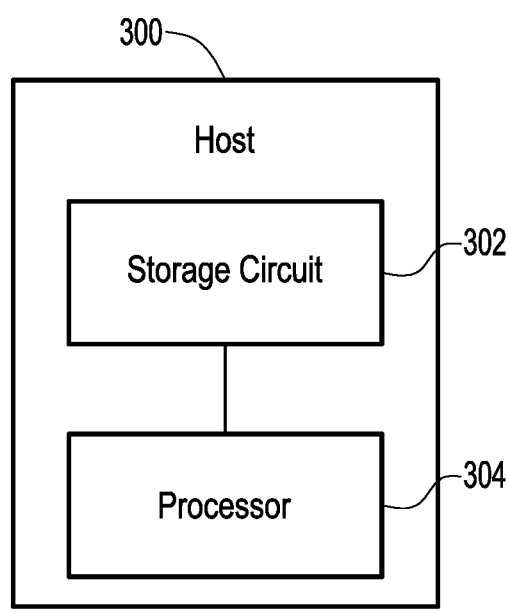
FIG. 3 is a schematic diagram of a host according to an embodiment of the disclosure.

FIG. 3 is a schematic diagram of a host according to an embodiment of the disclosure. In various embodiments, a host 300 may be any smart device and/or computer device. In some embodiments, the host 300 may be any electronic device capable of providing reality services (e.g., AR/VR/MR services, or the like). In some embodiments, the host 300 may be included in the head-mounted device 200 or the hand-held device 100. In some embodiments, the host 300 may be a computer and/or a server, and the host 300 may provide the computed results (e.g., AR/VR/MR contents) to other external display device(s) (e.g., the head-mounted device 200), such that the external display device(s) can show the computed results to the user. However, this disclosure is not limited thereto.

In FIG. 3, the host 300 includes a storage circuit 302 and a processor 304. The storage circuit 302 is one or a combination of a stationary or mobile random access memory (RAM), read-only memory (ROM), flash memory, hard disk, or any other similar device, and which records a plurality of modules and/or a program code that can be executed by the processor 304.

The processor 304 may be coupled with the storage circuit 302, and the processor 304 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 304 may access the modules and/or the program code stored in the storage circuit 302 to implement the hand tracking method provided in the disclosure, which would be further discussed in the following.

Figure 4:
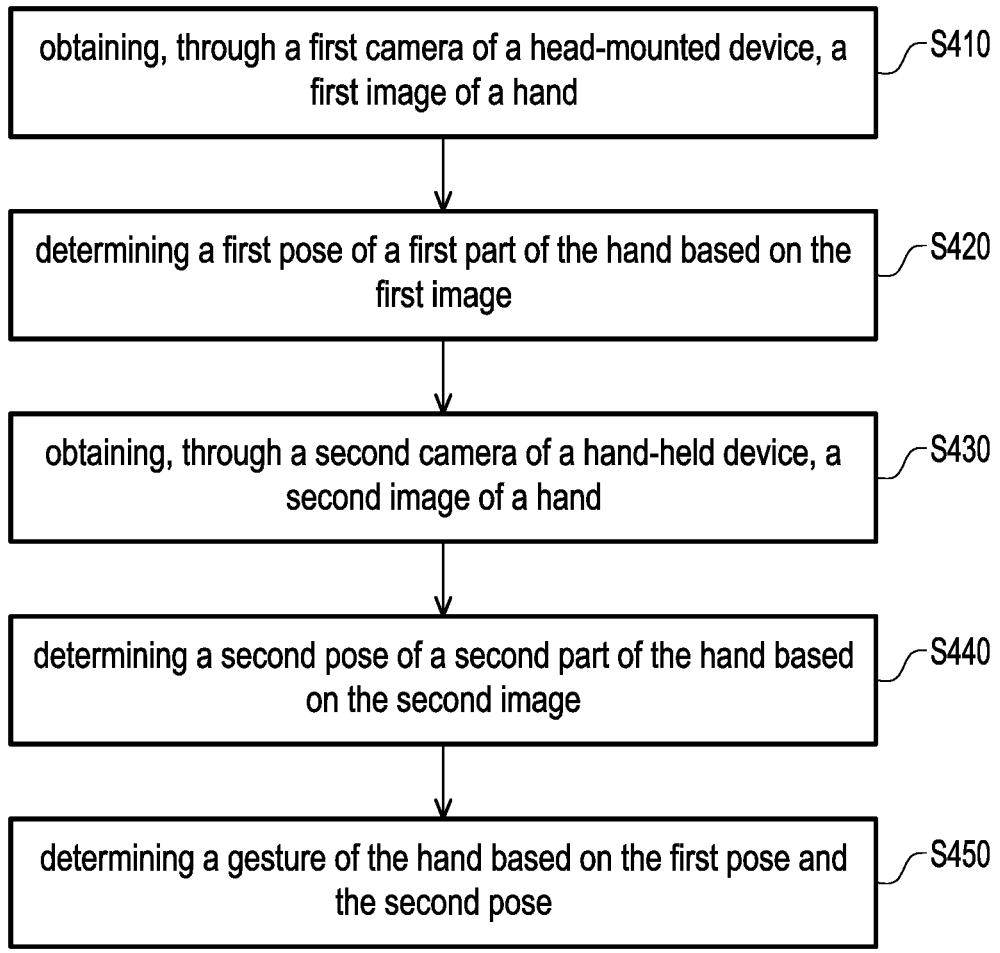
FIG. 4 is a schematic flowchart of a hand tracking method according to an embodiment of the disclosure.
Figure 5A:
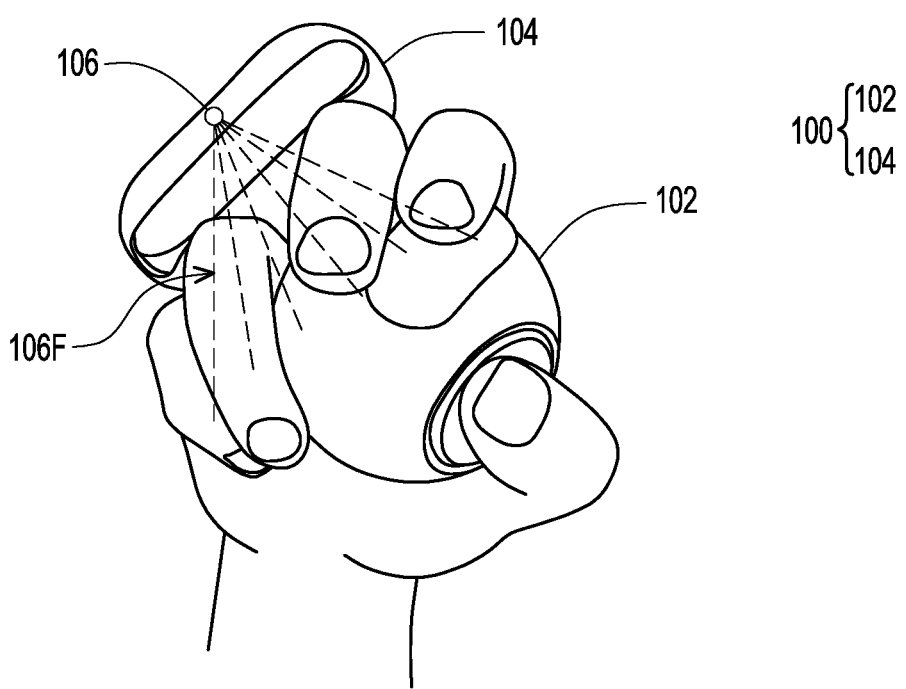
FIG. 5A is a schematic diagram of a hand tracking scenario according to an embodiment of the disclosure.
Figure 5B:
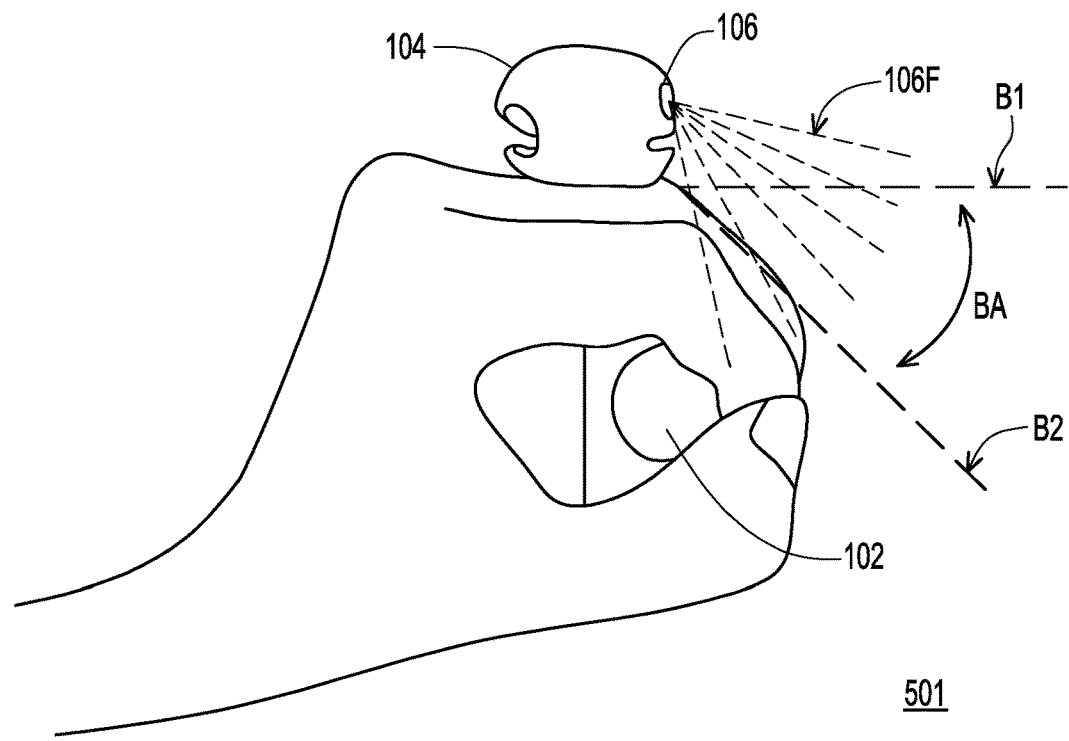
FIG. 5B is a schematic diagram of a hand tracking scenario according to an embodiment of the disclosure.
Figure 5C:
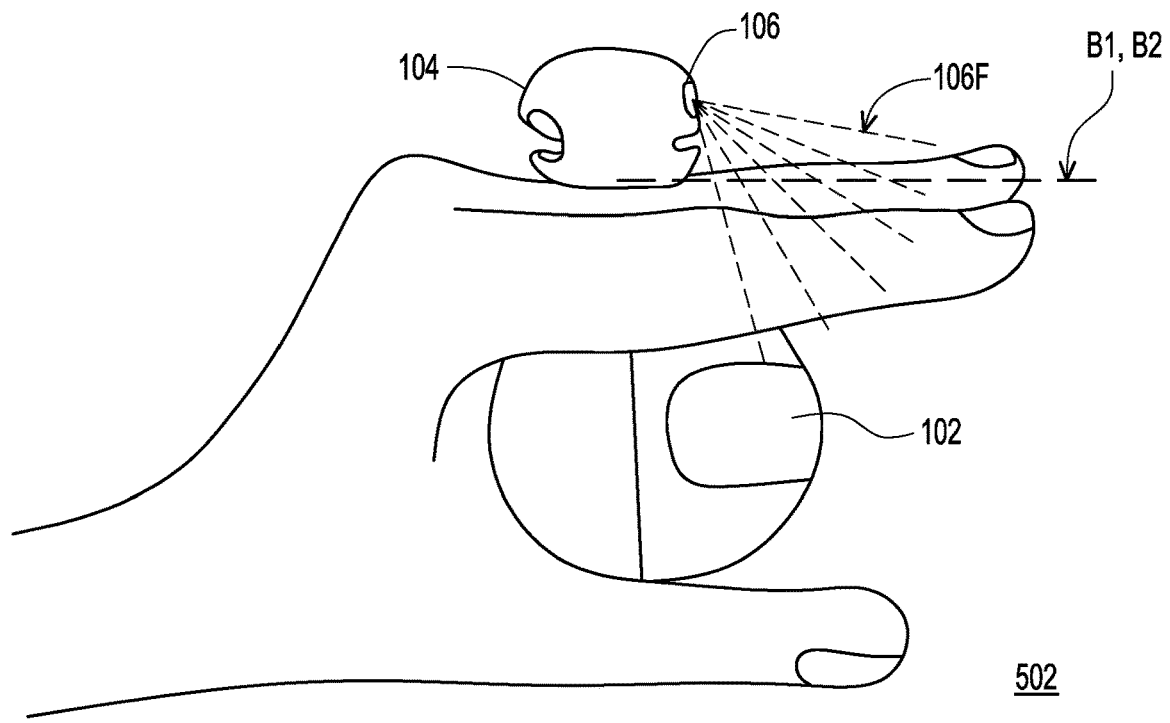
FIG. 5C is a schematic diagram of a hand tracking scenario according to an embodiment of the disclosure.

FIG. 4 is a schematic flowchart of a hand tracking method according to an embodiment of the disclosure. The hand tracking method of this embodiment may be executed by the host 300 in FIG. 3, and the details of each step in FIG. 4 will be described below with the components shown in FIG. 2 and FIG. 3. In addition, for better understanding the concept of the disclosure, FIG. 5A to FIG. 5C would be used as examples for explanation, wherein FIG. 5A to FIG. 5C show hand tracking scenarios according to some embodiments of the disclosure.

First, in a step S410, the first camera 202 of the head-mounted device 200 may be configured to obtain a first image of a hand. Next, in a step S420, the processor 304 may be configured to determine a first pose of a first part of the hand based on the first image. For example, the processor 304 may be configured to perform a first hand tracking of the hand based on the first image. Then, the processor 304 may be configured to determine the first pose based on the first hand tracking. However, this disclosure is not limited thereto.

It is noteworthy that, when the user is wearing the hand-held device 100, part of the hand (also referred to as a second part) may be occluded by the hand-held device 100. For example, as shown in FIG. 5A, when the hand-held device 100 is worn near a middle finger and a ring finger of the hand, the middle finger and the ring finger may be occluded by the hand-held device 100. That is, in the first image, nodes (e.g., joints) of the middle finger and the ring finger may not be completely seen. Therefore, poses (e.g., extended or bent) of the middle finger and the ring finger may be unable to be determined based on the first image (e.g., through the first hand tracking).

On the other hand, rest of the part of the hand (also referred to as the second part) is not occluded by the hand-held device 100. That is, in the first image, nodes of the rest of the part (e.g., the thumb, the index finger, and the pinky) may be completely seen. Therefore, poses (also referred to as the first pose) of the rest of the part may be determined based on the first image (e.g., through the first hand tracking).

In other words, the processor 304 may be configured to classify fingers of the hand into the first part of a known pose or the second part of an unknown known based on the first image (e.g., through the first hand tracking). That is, by utilizing the first camera 202 of the head-mounted device 200, the first pose of the first part may be determined and the second pose of the second part may be unable to be determined.

Then, in a step S430, the second camera 106 of the hand-held device 100 may be configured to obtain a second image of the hand. Afterwards, in a step S440, the processor 304 may be configured to determine a second pose of a second part of the hand based on the second image. For example, the processor 304 may be configured to perform a second hand tracking of the hand based on the second image. Then, the processor 304 may be configured to determine the second pose based on the second hand tracking. However, this disclosure is not limited thereto. In one embodiment, the first part and the second part complementarily form an entirety of the hand. For example, the first part may include the thumb, the index finger, and the pinky and the second part may include the middle finger and the ring finger. However, this disclosure is not limited thereto.

Reference is made to FIG. 5A again. When the user is wearing the hand-held device 100, a direction and/or a position of the second camera 106 may be designed to capture images of the part of the hand (i.e., the second part) occluded by the hand-held device 100. That is, the second camera 106 may be disposed to face the second part of the hand. For example, a field of view (FOV) 106F of the second camera 106 may be disposed to face the second part of the hand. Therefore, based on the second image from the second camera 106, the second hand tracking may be performed. Based on the second image (e.g., through the second hand tracking), the second pose (e.g., extended or bent) of the second part may be determined.

Reference is now made to FIG. 5B and FIG. 5C. In a hand tracking scenario 501 of FIG. 5B, the hand of the user may be in a grasping gesture. Alternatively, in a hand tracking scenario 502 of FIG. 5C, the hand of the user may be in an open hand gesture posture. In other words, each finger of the hand is bent in the hand tracking scenario 501 and each finger of the hand is extended in the hand tracking scenario 502.

In one embodiment, the processor 304 may be configured to determine a percentage of the FOV 106F of the second camera 106 that is occupied by a finger of the second part of the hand based on the second image. Further, the processor 304 may be configured to determine the finger is extended or bent based on the percentage. For example, in the hand tracking scenario 501, when a finger is bent, the finger is not shown in the FOV 106F. That is, the percentage may be zero.

On the other hand, in the hand tracking scenario 502, when a finger is extended, the finger is shown in the FOV 106F. That is, the percentage is not zero. Therefore, by comparing the percentage with a predetermined threshold value, whether the finger is extended or bent may be determined. The predetermined threshold value may be, for example, 100%, 80%, 60, or any other number according to design need and this disclosure does not limit a value of the predetermined threshold value.

In one embodiment, the processor 304 may be configured to determine a presence of a fingernail of a finger of the second part is in a FOV 106F of the second camera 106 based on the second image. Further, the processor 304 may be configured to determine the finger is extended or bent based on the presence. For example, in the hand tracking scenario 501, when a finger is bent, a fingernail of the finger is not shown in the FOV 106F. On the other hand, the hand tracking scenario 502, when a finger is extended, a fingernail of the finger is shown in the FOV 106F. Therefore, based on the presence of a fingernail being in the FOV or not, whether the finger is extended or bent may be determined. In addition, a presence of a distal joint of the finger may be also utilized to determine the finger is extended or bent based on the percentage and the presence, while the details are not redundantly described seriatim herein.

In one embodiment, not only the percentage of the FOV 106F that is occupied by a finger may be utilized, but also the presence of the fingernail of the finger may be utilized together at the same time to increase the accuracy of the hand tracking. That is, the processor 304 may be configured to determine the finger is extended or bent based on the percentage and the presence.

In one embodiment, the processor 304 may be configured to determine an angle between a proximal boundary of a finger of the second part and a distal boundary of the finger. Further, the processor 304 may be configured to determine the finger is extended or bent based on the angle. For example, a finger may have three phalanges, including a proximal phalange, a middle phalange, and a distal phalange. In the hand tracking scenario 501, when a finger is bent, an angle between a boundary B1 of the proximal phalange (also referred to as a proximal boundary) and a boundary B2 of the distal phalange or the middle phalange (also referred to as a distal boundary) may be shown as a boundary angle BA. On the hand, in the hand tracking scenario 502, when a finger is extended, the angle between the boundary B1 and the boundary B2 may be (approximately) zero. Therefore, by comparing the angle with a predetermined threshold value, whether the finger is extended or bent may be determined. The predetermined threshold value may be, for example, a degree 15, 30, 45, or any other number according to design need and this disclosure does not limit a value of the predetermined threshold value.

Last, in a step S450, the processor 304 may be configured to determine a gesture of the hand based on the first pose and the second pose. That is, although some fingers of the hand may be occluded by the hand-held device 100, the first camera 202 and the second camera 106 may work together to capture images of all the fingers. In other words, based on the gesture, whether each finger of the hand is extended or bent may be determined. In this manner, by a fusion of the first image from the first camera 202 and the second image from the second camera 106, an accuracy of the hand tracking may be improved when the user is wearing the hand-held device 100.

In one embodiment, to save power, the second camera 106 may be usually disabled (turned off). That is, the second camera 106 may be configured to be enabled (turned on) only in response to a hand tracking request being received by the processor 304. However, this disclosure is not limited thereto.

In one embodiment, the body part 102 of the hand-held device 100 may further include a capture sensor. The capture sensor is configured to obtain sensor data. Further, the processor 304 may be configured to determine whether the hand is in a grasping gesture based on the sensor data. For example, the capture sensor is a distance sensor or a contact sensor and the sensor data is configured to indicate a distance between a finger of the hand and the body part 102. When the hand is in the grasping gesture (e.g., holding the body part 102), a finger is in contact with the body part 102 and a distance between the finger and the body part 102 is zero. On the other hand, when the hand is not in the grasping gesture (e.g., holding the body part 102), a finger is not in contact with the body part 102 and a distance between the finger and the body part 102 is not zero.

In one embodiment, the body part 102 of the hand-held device 100 may further include a button. The button may be configured to gather input from the user. However, this disclosure is not limited thereto.

In summary, according to the hand tracking method, the host, and the hand tracking system, by a fusion of the first image from the first camera 202 and the second image from the second camera 106, an accuracy of the hand tracking may be improved when the user is wearing the hand-held device 100.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for hand tracking, comprising:
    obtaining, through a first camera of a head-mounted device, a first image of a hand;
    determining, through the processor, a first pose of a first part of the hand based on the first image;
    obtaining, through a second camera of a hand-held device, a second image of the hand;
    determining, through the processor, a second pose of a second part of the hand based on the second image, wherein the first part and the second part complementarily form an entirety of the hand; and
    determining, through the processor, a gesture of the hand based on the first pose and the second pose.

2. The method according to claim 1, further comprising:
    classifying, through the processor, fingers of the hand into the first part of a known pose or the second part of an unknown pose based on the first image.

3. The method according to claim 1, further comprising:
    determining whether each finger of the hand is extended or bent based on the gesture.

4. The method according to claim 1, further comprising:
    determining a percentage of a field of view of the second camera that is occupied by a finger of the second part of the hand based on the second image; and
    determining the finger is extended or bent based on the percentage.

5. The method according to claim 1, further comprising:
determining a presence of a fingernail of a finger of the second part is in a field of view of the second camera based on the second image; and
determining the finger is extended or bent based on the presence.

6. The method according to claim 1, further comprising:
determining a percentage of a field of view of the second camera that is occupied by a finger of the second part of the hand based on the second image;
determining a presence of a fingernail of the finger is in a field of view of the second camera based on the second image; and
determining the finger is extended or bent based on the percentage and the presence.

7. The method according to claim 1, further comprising:
determining an angle between a proximal boundary of a finger of the second part and a distal boundary of the finger; and
determining the finger is extended or bent based on the angle.

8. The method according to claim 1, further comprising:
generating a simultaneous localization and mapping map of an environment around a user by a fusion of the first image and the second image; and
determining positions and orientations of the head-mounted device and the hand-held device based on the simultaneous localization and mapping map.

9. The method according to claim 1, further comprising:
obtaining, through a capture sensor of the hand-held device, sensor data; and
determining whether the hand is in a grasping gesture based on the sensor data.

10. The method according to claim 9, wherein the capture sensor is a distance sensor or a contact sensor and the sensor data is configured to indicate a distance between a finger of the hand and a body part of the hand-held device.

11. A host, comprising:
a storage circuit, storing a program code; and
a processor, coupled to the storage circuit and accessing the program code to execute:
obtaining, through a first camera of a head-mounted device, a first image of a hand;
determining a first pose of a first part of the hand based on the first image;
obtaining, through a second camera a hand-held device, a second image of the hand;
determining a second pose of a second part of the hand based on the second image,
wherein the first part and the second part complementarily form an entirety of the hand; and
determining a gesture of the hand based on the first pose and the second pose.

12. The host according to claim 11, wherein the processor is further configured to access the program code to execute:
classifying, through the processor, fingers of the hand into the first part of a known pose or the second part of an unknown pose based on the first image.

13. The host according to claim 11, wherein the processor is further configured to access the program code to execute:
determining whether each finger of the hand is extended or bent based on the gesture.

14. The host according to claim 11, wherein the processor is further configured to access the program code to execute:
determining a percentage of a field of view of the second camera that is occupied by a finger of the second part of the hand based on the second image; and
determining the finger is extended or bent based on the percentage.

15. The host according to claim 11, wherein the processor is further configured to access the program code to execute:
determining a presence of a fingernail of a finger of the second part is in a field of view of the second camera based on the second image; and
determining the finger is extended or bent based on the presence.

16. The host according to claim 11, wherein the processor is further configured to access the program code to execute:
determining a percentage of a field of view of the second camera that is occupied by a finger of the second part of the hand based on the second image;
determining a presence of a fingernail of the finger is in a field of view of the second camera based on the second image; and
determining the finger is extended or bent based on the percentage and the presence.

17. The host according to claim 11, wherein the processor is further configured to access the program code to execute:
determining an angle between a proximal boundary of a finger of the second part and a distal boundary of the finger; and
determining the finger is extended or bent based on the angle.

18. The host according to claim 11, wherein the processor is further configured to access the program code to execute:
generating a simultaneous localization and mapping map of an environment around a user by a fusion of the first image and the second image; and
determining positions and orientations of the head-mounted device and the hand-held device based on the simultaneous localization and mapping map.

19. A hand tracking system, comprising:
a head-mounted device, adapted to be mounted on a head and comprising:
a first camera, configured to obtain a first image of a hand;
a hand-held device, adapted to be worn on the hand and comprising:
a body part, adapted to be hold by the hand; and
an extension part, extending from the body part and comprising:
a second camera, configured to obtain a second image of the hand;
a storage circuit, storing a program code; and
a processor, coupled to the storage circuit and accessing the program code to execute:
determining a first pose of a first part of the hand based on the first image;
determining a second pose of a second part of the hand based on the second image,
wherein the first part and the second part complementarily form an entirety of the hand; and
determining a gesture of the hand based on the first pose and the second pose.

20. The hand tracking system according to claim 19, wherein the body part comprises a capture sensor and the processor is further configured to access the program code to execute:
obtaining, through the capture sensor of the hand-held device, sensor data; and
determining whether the hand is in a grasping gesture based on the sensor data.

* * * * *